United States Patent [19]
Royer et al.

[11] Patent Number: 5,461,797
[45] Date of Patent: Oct. 31, 1995

[54] OBJECT MEASURING SYSTEM

[75] Inventors: Tony A. Royer; Mark Cowan, both of West Alexandria, Ohio

[73] Assignee: M&M Precision Systems Corporation, West Carrollton, Ohio

[21] Appl. No.: 230,332

[22] Filed: Apr. 19, 1994

[51] Int. Cl.⁶ .............................. G01B 5/03; G01B 5/16
[52] U.S. Cl. .................. 33/501.7; 33/501.14; 33/505
[58] Field of Search .................... 33/1 M, 501.7, 33/501.14, 501.15, 501.9, 503, 504, 505, 546, 549, 551, 556, 559

[56]  References Cited

U.S. PATENT DOCUMENTS

| | | |
|---|---|---|
| 2,992,491 | 7/1961 | Höfler . |
| 3,800,423 | 4/1974 | Munro et al. . |
| 3,936,946 | 2/1976 | Ruffner et al. . |
| 3,945,124 | 3/1976 | Jacoby et al. . |
| 4,228,591 | 10/1980 | Sterki et al. . |
| 4,297,788 | 11/1981 | Sterki et al. . |
| 4,322,889 | 4/1982 | Guenter .................................. 33/501.9 |
| 4,437,151 | 3/1984 | Hurt et al. .............................. 33/503 |
| 4,498,335 | 2/1985 | Thoma ................................... 33/501.9 |
| 4,519,241 | 5/1985 | Höfler . |
| 4,519,242 | 5/1985 | Höfler . |
| 4,610,091 | 9/1986 | Bertz et al. . |

OTHER PUBLICATIONS

"Gear Measurement on a Multi-Coordinate Measuring Device", Hans Joachim Neumann, Jun. 24–26, 1980, Zeiss Publication, along with English translation.
"Pitch Measurement", Gear Metrology, pp. 32–45, London, 1969.
Klingelnberg product brochure entitled: "Fully automatic CNC–controlled Gear Measuring Centers PNC 130 VA / PNC 200 VA", date unknown.

*Primary Examiner*—William A. Cuchlinski, Jr.
*Assistant Examiner*—G. Bradley Bennett
*Attorney, Agent, or Firm*—Watts, Hoffmann, Fisher & Heinke Co.

[57]  ABSTRACT

A monitoring system having a stylus mounted to a support that controllably moves the stylus along a travel path as it contacts an object of interest. The object is supported by a rotating turntable and held in place by a retainer that exerts a repeatable downward force on the object. A frame that supports the stylus is moved by a number of motors to provide three mutually orthogonal directions of motion to the stylus. Coordinated translations of the stylus and rotations of the object allow the monitoring system to check the shape of the object and compare the measured shape with specifications for the object.

5 Claims, 8 Drawing Sheets

OBJECT MEASURING SYSTEM

FIELD OF THE INVENTION

The present invention concerns an automated monitoring system and method for determining or confirming the shape of a manufactured item such as a gear.

BACKGROUND ART

The Assignee of the present invention, M&M Precision Systems Corporation, has commercialized prior monitoring systems for determining or confirming the shape of a machined item such as a gear and the like. These prior art monitoring systems are commercially sold under the designation Model Numbers 3012, 3015, 3018, 3025, 3040 and 3060 where the last two digits indicate the diameter of the workpieces (in inches) the system is capable of monitoring.

The prior art systems sold by the Assignee of the invention include a moveable frame mounted to a base and include a drive system for moving a stylus or probe along three independent directions by controlled energization of multiple drive motors.

An arm that extends away from the frame has a stylus at one end which comes into contact with the object under examination. The stylus includes an LVDT monitoring probe that produces an output signal related to the position of a moveable probe member with respect to a probe body. Through a controlled monitoring of the output signals from the probe, and controlled movement of the frame, including a feedback monitoring of optical encoder signals as the frame moves, the monitoring system can accurately determine the position of the moveable probe tip. This allows the monitoring system to accurately compare any curve on a surface of a machined part with the desired shape of that surface. Alternately the monitoring system can test an unknown surface and store a representation of the part for later use as a standard.

In accordance with the prior art monitoring systems, the object under examination is supported on a turntable and held in place by a clamping member. Once the object has been secured to the turntable, controlled energization of a turntable drive causes the object to rotate. Precise control over the turntable rotation is achieved by controlled actuation of the turntable motor.

The prior art systems sold by the assignee of the present invention have particular utility in confirming the shape of an object having regularly occurring variations in contour. An example of such an object is a gear that has gear teeth spaced at regular intervals about the circumference of the gear. One use of the prior art monitoring systems is to detect differences between the desired shape of a gear and the actual shape of a gear that has been machined to assure that a desired degree of accuracy has been achieved. If the gear is not up to specifications corrective steps are taken to achieve more precision in the manufacture of the gear.

DISCLOSURE OF THE INVENTION

Apparatus constructed in accordance with the invention checks a configuration of an object mounted for rotation about an axis. The apparatus confirms the position of a series of regularly occurring circumferential spaced apart features around a surface of the object.

A preferred apparatus has a moveable probe having a stylus for contacting a surface of the object and a support for the probe. A drive system moves the probe along controlled paths to contact the object as a motor rotates the object about the axis.

A controller activates the motor to rotate the object to a series of measurement orientations and also activates the drive system to move the probe along a path that causes the stylus to contact the object. The controller stores indications of the locations at which the stylus contacts the object at each of the measurement orientations. The controller knows the desired object profile and therefore can compare the sensed contact co-ordinates with the target positions and compute deviations between the sensed point of contact and an object profile corresponding to an object shape.

BEST MODE FOR PRACTICING THE INVENTION

Figure 1:
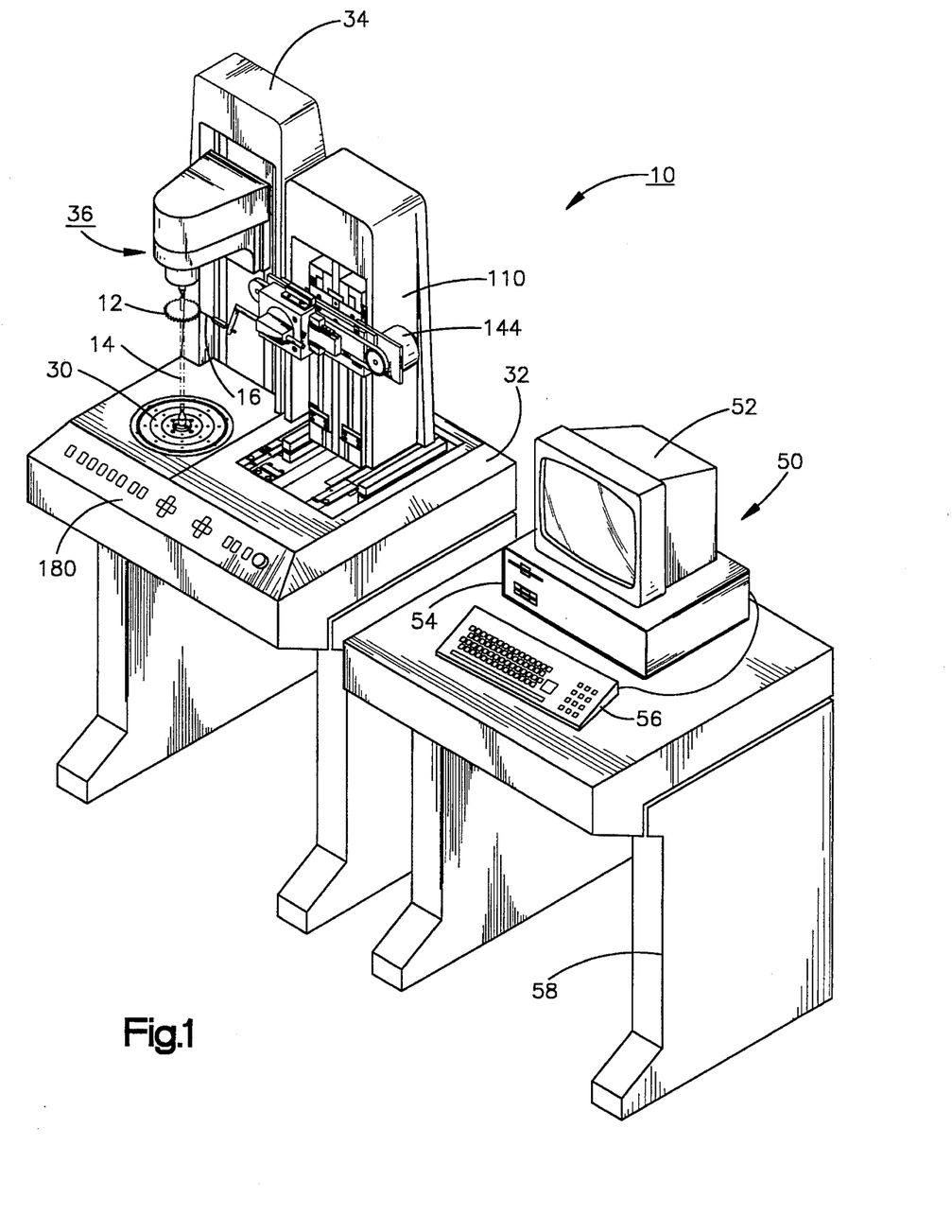
FIG. 1 is a perspective view of a monitoring system constructed in accordance with the present invention.

FIG. 1 is a perspective view of a monitoring system 10 that is used to evaluate a workpiece 12 such as a machined product that has been manufactured to certain specifications. The particular workpiece 12 depicted in the drawings is a gear which has a tooth pattern that is to be checked by the monitoring system 10. One use of the monitoring system is to perform a periodic check of the workpieces that are being produced and determine if the workpiece falls within customer specifications.

An alternate use of the monitoring system is for checking the shape of an unknown curve and defining that curve with a series of co-ordinate locations. Either of these applications typically requires that the workpiece be rotated about a center axis 14 as a probe stylus 16 contacts a surface of the workpiece. The particular gear shown in the drawings requires that the probe stylus 16 contact an outer surface but the probe can be configured to also monitor the shape of an interior curve of an annular object.

Figure 2:
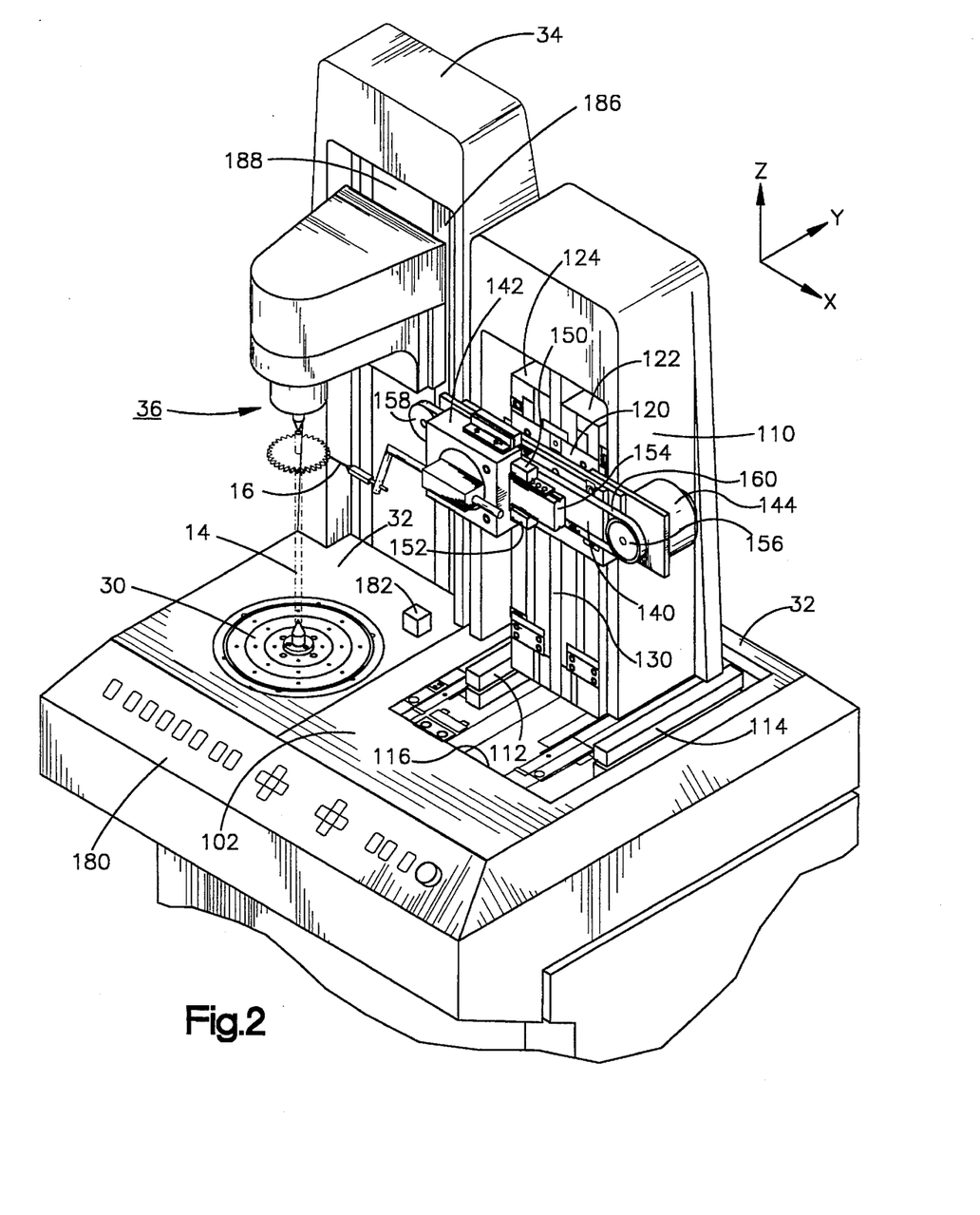
FIG. 2 is an enlarged perspective view of the FIG. 1 monitoring system showing an object holder for securing an object in place on a rotating turntable in spaced relation to a moveable stylus.

The gear shown in FIGS. 1 and 2 is mounted to a rotating circular table 30 supported on a base 32. Extending upward away from the base 32 is a column 34 that supports an object retainer 36. Prior to monitoring the shape of an object, the object must be positioned in contact with the table 30 and fixed in place by the object retainer 36 by moving the retainer up and down with respect to the column 34.

Once the workpiece has been fixed to the table 30 the stylus 16 is brought into engagement with a surface of the workpiece and the table is rotated as the stylus moves in and out to follow the contour of the workpiece. In a use where the monitoring system is to monitor a shape and compare that shape with a known standard the stylus is made to follow a controlled path and deviations between the sensed shape of the object and the controlled path are plotted.

Figure 5:
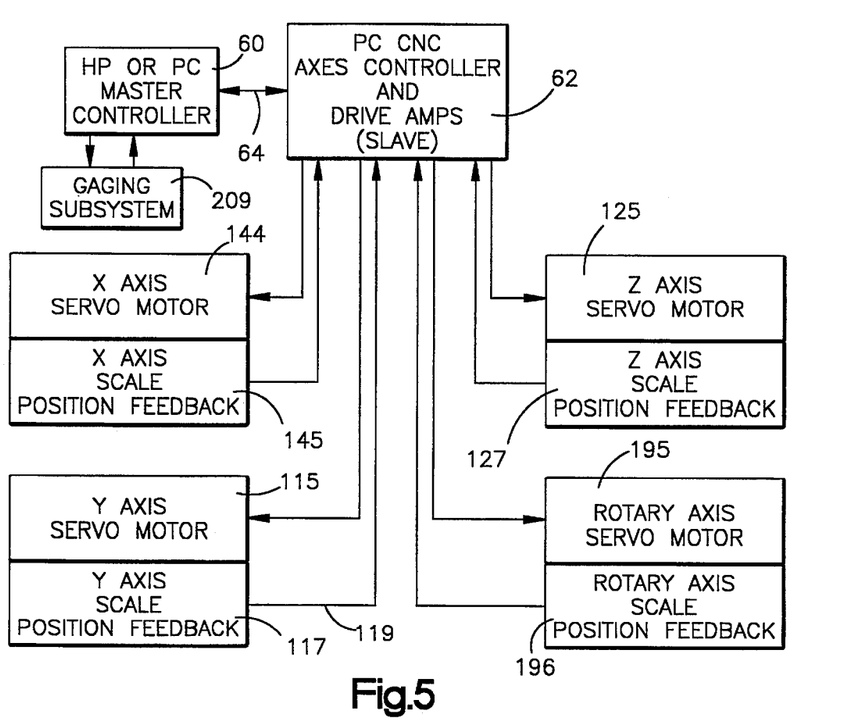
FIG. 5 is a block diagram showing electronics for activating motors used to move the probe and rotate the object as the probe contacts the object.

The monitoring system includes an operator console 50 which allows an operator or user to view the monitoring process on a viewing screen 52. The viewing screen is updated by a computer 54 that responds to user inputs entered at a keyboard 56 and responds to those inputs to display data and perform calculations. The computer rests on a base 58 spaced to the side of base 32 supporting the moving stylus 16. The computer 54 includes a programmable central processing unit 60 (FIG. 5) that executes a control program that updates the display and directs movements of the stylus 16.

A second programmable controller 62 acts as a slave to the programmable controller in the computer 54 to control movement of the stylus 16. The second programmable controller 62 has an interface that is electrically coupled to sensors and servo drives that monitor and control movement of the stylus 16. The second controller communicates with the computer 54 via a serial interface 64.

The base 32 positioned beside the console 50 supports structure for moving the stylus along a controlled travel path. The base 32 defines a generally flat, level surface 102 (FIG. 2) that supports a moveable frame 110. A frame guide includes two spaced apart fixed rails 112, 114 attached on opposite sides of a opening 116 in the base 32. The rails 112, 114 constrain the frame 110 to a linear travel path that defines a Y-direction in an orthogonal co-ordinate system. Since the frame 110 moves back and forth in the Y-direction, the frame is sometimes referred to as the Y-saddle.

A motor 115 mounted to the base moves the frame 110 relative to the base 32 along the "y" axis as seen in FIG. 2. This movement is monitored by an optical encoder 117 that feeds back information concerning movement of the frame 110 to the slave controller 62. The encoder 117 includes an optical sensor which moves with the frame and monitors a linear scale fixed to the base 32. Although the motor shaft very accurately rotates in response to controlled actuation by the slave controller 62, the position of the frame 110 in the "y" direction is determined from an optical encoder output 119.

The frame 110 supports a "z" saddle 120 for up and down movement with respect to the base 32. Vertically oriented frame supports 122,124 extend upward from the base 34 and define a linear travel path for the saddle 120. Rails attached to the supports 122,124 carry a ball bearing retainer. As the saddle 120 moves up and down with respect to the supports 122,124 ball bearings trapped within the retainer rotate and allow the relative translation between the frame 110 and the saddle 120.

A second motor 125 attached to the frame 110 includes an output shaft that rotates a drive pulley. A two layer z-axis drive belt 130 is reeved over the drive pulley and an idle pulley at the base of the frame 110. Up and down movement of the "z"-saddle 120 is monitored by a linear encoder 127 that senses motion and positioning of the saddle 120. The encoder sends back signals corresponding to movement of the saddle 120 that are used by the slave controller 62 to determine the position of the stylus 16 relative to a reference position.

Mounted to the z-saddle 120 is a probe support base 140 which supports an "x" saddle 142 for side to side movement in the "x" direction in response to controlled energization of a motor, 144. The "z" saddle 120 has an outer surface that is generally parallel to the x-z plane as that plane is defined in the drawings. The surface supports the base 140 by means of connectors that are threaded into openings in the surface. The x-saddle 142 is mounted for back and forth movement in the x direction by means of a track that includes rails 150,152 fixed to the saddle 142 and a rail 154 coupled to the base 140. These rails support a retainer having ball bearings that rotate as the rails move relative to each other in response to actuation of the motor 144.

Attached to the base 140 by means of suitable bearings are drive and idle pulleys 156,158 that support a drive belt 160 attached to the saddle 142 by connectors which extend through the belt. A linear encoder 145 monitors the x-direction movement of the saddle 142 thereby allowing the monitoring system controller 62 to determine the x co-ordinate position of the stylus 16.

A probe arm 170 (FIG. 3) is mounted to a probe mounting block 172 coupled to the saddle 142. The orientation of the probe arm 170 with respect to the saddle can be adjusted depending on the object under examination by the monitoring system.

Figure 3:
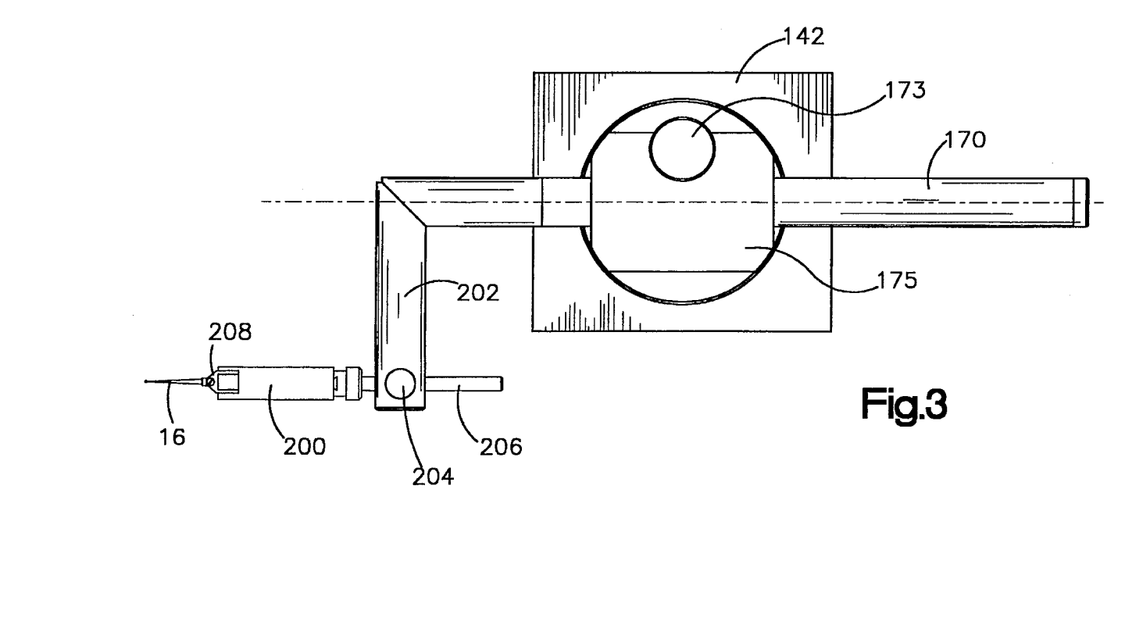
FIG. 3 is an elevation view of a stylus support for moving the stylus into engagement with an object held in place on the rotating turntable.
Figure 4:
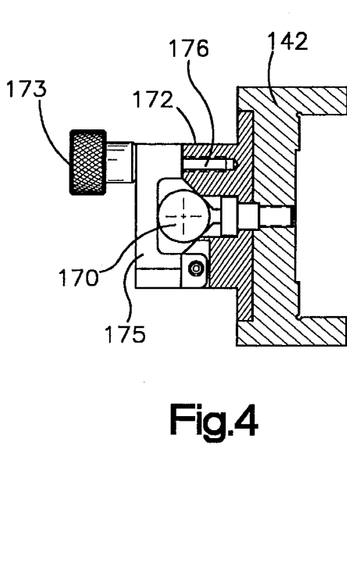
FIG. 4 is a partially sectioned view of the FIG. 3 probe support.

FIGS. 3 and 4 illustrate the means of attaching the probe arm 170 to the x-saddle 142. The position of the probe arm 170 relative to the x-saddle 142 can be adjusted to bring the probe 16 to a position so that controlled activation of the motors 115,125,144 precisely positions the probe 16. Once the probe arm 170 is fixed relative to the xyz coordinate system, the probe 16 is moved into contact with sides of an object 182 so that the controller knows the coordinates of the probe 16 with great precision.

To roughly position the arm relative the x-saddle, the user must free the probe arm 170 for back and forth movement along the x direction. A knurled knob 173 is rotated to loosen the probe arm 170. The probe arm 170 is supported by a bracket 175 and the mounting block 172. Extending through the bracket 175 is a pin 176 that rotates as the knurled knob 173 is rotated. A clutched fastener is loaded by rotation of the knurled knob 173. As the knob is rotated, the fastener causes the bracket 175 to pivot slightly about a pivot point 177 in a clockwise direction as seen in FIG. 4. This tightens the engagement between the mounting block 172, the bracket 175 and the probe arm 170. Overtightening of the probe arm 170 is prevented by the clutched fastener. As the user continues to rotate the knurled knob, the clutch prevents the fastener from overtightening and thereby avoids stresses on the probe arm that affect accuracy of the probe measurements.

During setup of the monitoring system 10 the three motors 115, 125, 144 are manually actuated by means of a touch panel control 180 on the front of the base 32. The control panel allows the operator to bring the stylus 16 into contact with a reference object 182 whose position on the base 32 is known. By engaging surfaces of the reference object 182 the monitoring system defines a coordinate reference position. As the probe or stylus moves away from this reference position the controller updates the position of the stylus. Thus, as the monitoring system moves the stylus 16 along a controlled path with respect to the coordinate reference position corresponding to the desired object's shape, the controller knows the x, y, z co-ordinate of the path and can compare deviations from the path that are sensed by the stylus.

The retainer 36 is fixed to an upright 186 along an elongated track 188 that extends vertically along the upright. The retainer 36 supports a center 190 aligned with an axis of rotation of the turntable 30 having a downwardly extending conical portion 192 that engages the top portion of the object under examination. To mount the object onto the turntable, an operator moves the retainer 36 upward and places an object such as a gear on a support 194. The retainer 36 is then moved down until the center's conical end 192 contacts the object and an indicator light signals the user the object is fixed in place. The object turntable 30 is rotated about the axis 14 by a motor 195 supported by a turntable base fixed to the base 32. The motor has an output shaft connected by a transmission to a rotating hub that is attached to the turntable 30. A rotary encoder 196 such as an Inductosyn™ also monitors the orientation of the turntable 30 and this information is used by the slave controller 62 as an object is being inspected.

As seen in FIG. 3 the stylus 16 is supported by a probe body 200 that engages a right angle portion 202 of the probe arm 170. The position of the probe body 200 with respect to the arm can also be adjusted by a connector 204 that allows a probe support pin 206 to be moved along the x direction. A preferred LVDT probe is commercially available from Tesa Inc., a Swiss company whose U.S. distributor is Brown and Sharp. This probe has a pivoting stylus 16 that pivots about a pivot point 208 when the stylus tip comes in contact with an object under examination. Rotation of the stylus causes an electrical signal to be developed that causes the controller 62 to note the deflection of the probe. The probe tip uses an LVDT sensor to monitor orientation and interfaces via a circuit 209 with the master controller 60. A unidirection or bidirectional probe may also be used. Also a one degree of freedom or three degree of freedom probe may be used to sense analog type measurement deviations.

THE OBJECT MEASUREMENT

Figure 6:
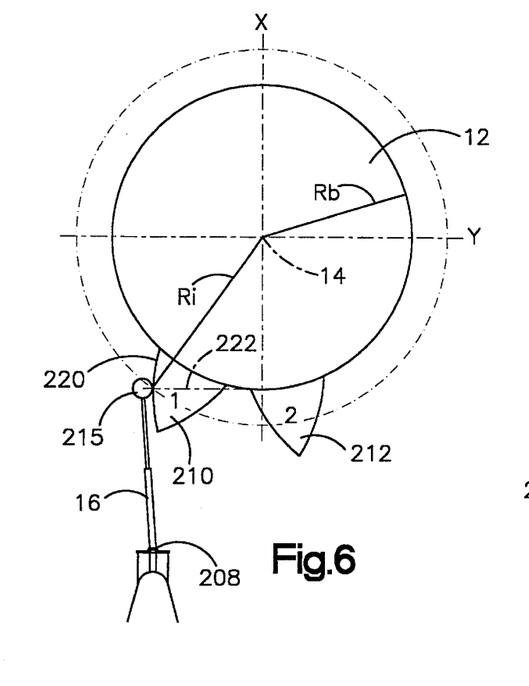
FIGS. 6 and 6A are diagrams showing sequential relative positions between the probe and an object being examined.

FIGS. 6–16 illustrate the measurement process as an object 12 such as a gear having regularly spaced teeth about its outer circumference is monitored by the monitoring system 10. The object 12 depicted in FIG. 6 is mounted to the turntable 30 by the retainer 36. Whenever rotation of the object 12 or movement of the stylus 16 is mentioned it is understood that this rotation and/or movement is performed under the control of the slave controller 62 that activates the four motors 115,125,144, and 195.

In FIG. 6 two dimensions Rb, Ri correspond to a so-called base circle radius and the inspection circle radius. Although it is understood the gear has teeth that extend completely around the gear, only two teeth 210, 212 are depicted. A first tooth 210 is used as a reference for all other teeth to be measured. As inspection proceeds other teeth are inspected based upon a theoretical position of their flanks or outer surfaces relative the first tooth 210. The inspection procedure can be performed starting on either flank of the gear teeth and can proceed in either a clockwise or counterclockwise direction.

Figure 6A:
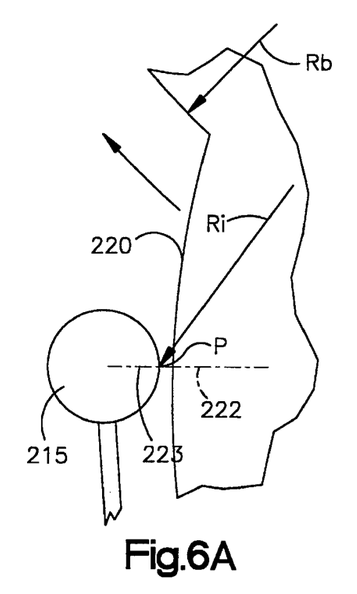
Figure 7:
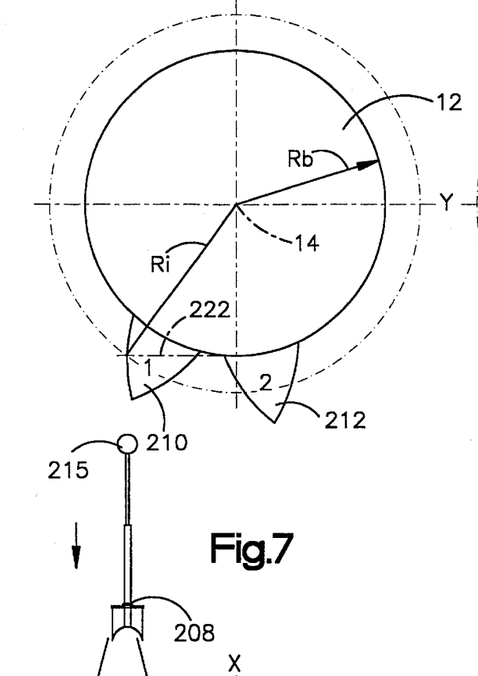
FIGS. 7, 8, 9, 10, 11, 12, 12A, 13, 14, 15 and 16 are diagrams sequentially depicting the object checking.

The situation depicted in FIG. 6 is the beginning of the set-up for the inspection process. A left flank 220 of the tooth 210 is contacted by a spherical probe tip 215. The probe tip is first offset in the "y" direction until a contact point P between the tip and left flank 220 has the same y coordinate as the intersection between a tangent 222 to the base radius Rb and the inspection radius Ri. The probe is then moved in along the x axis to place the x centerline 223 of the spherical probe tip 215 on the tangent line 222 at the inspection radius Ri (see FIG. 6A). The gear 12 is then rotated until the left tooth flank 220 deflects the probe so that the gaging circuit 209 reads zero. As the probe tip 215 is deflected, the gauging system 209 changes from an output of −0.015 inches (undeflected) through 0.000 and ends at a maximum deflection of +0.015 inches. When the gauging system reads zero, the angular position of the left flank 220 is recorded from the rotary scale 196. The stylus is then retracted away from the inspection radius (FIG. 7).

Figure 8:
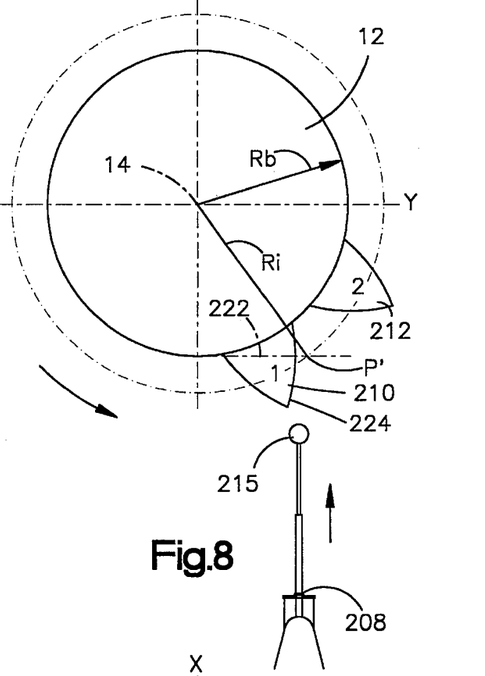
Figure 9:
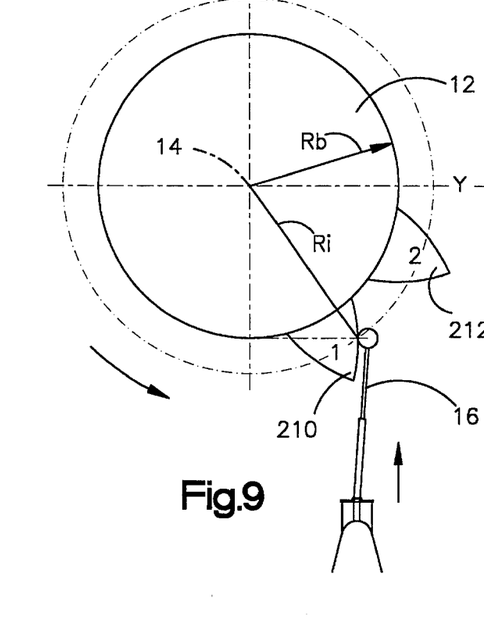
Figure 10:
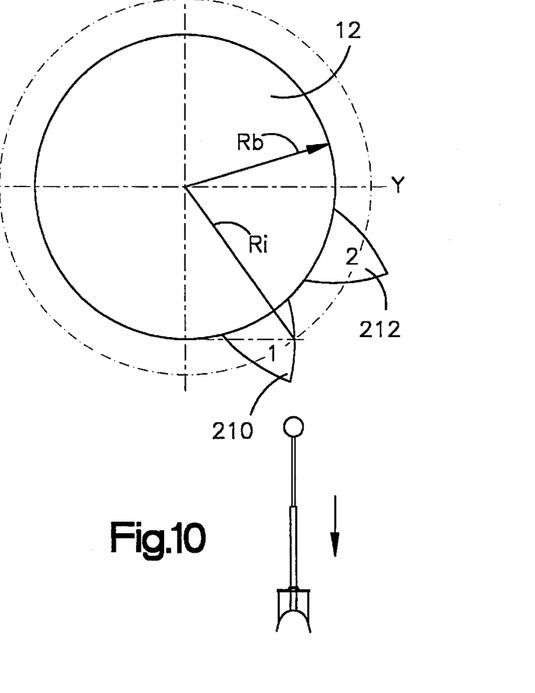
Figure 11:
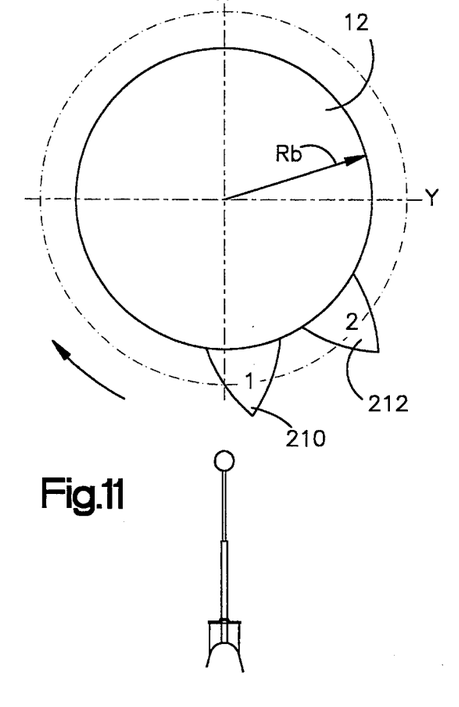
Figure 12:
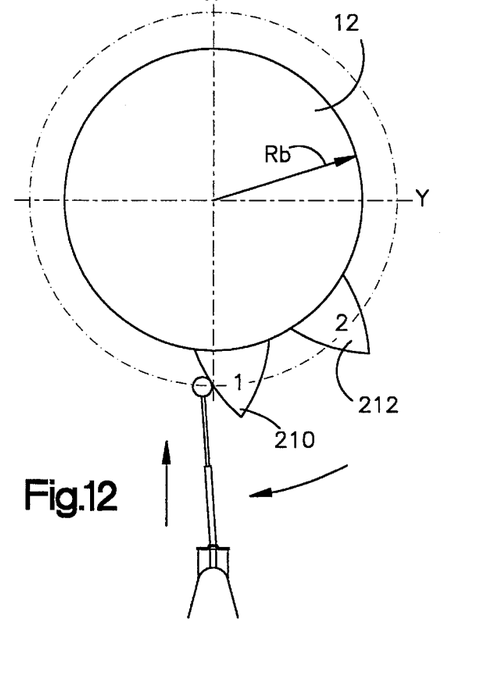
Figure 12A:
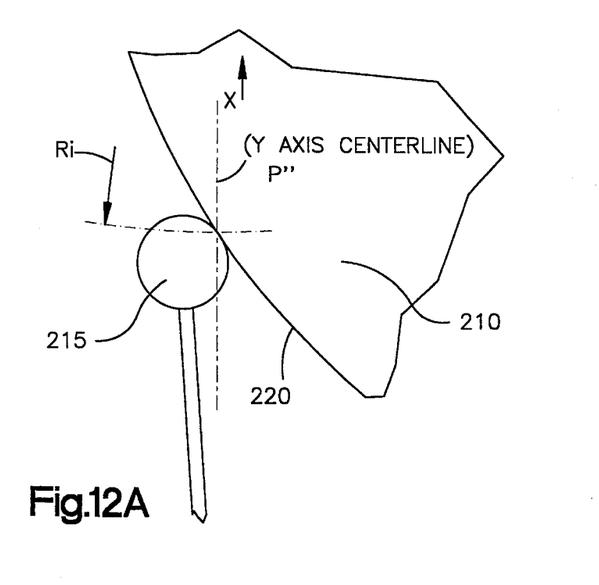
Figure 13:
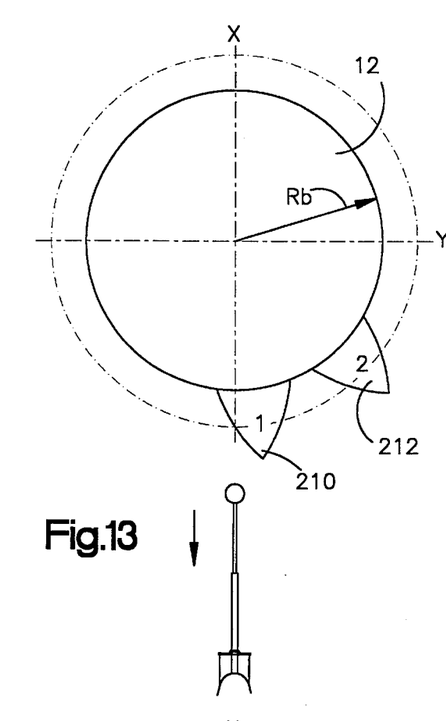
Figure 14:
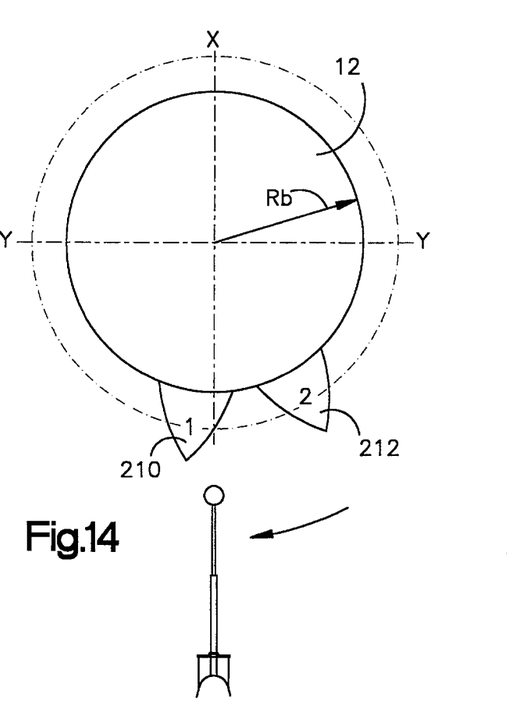
Figure 15:
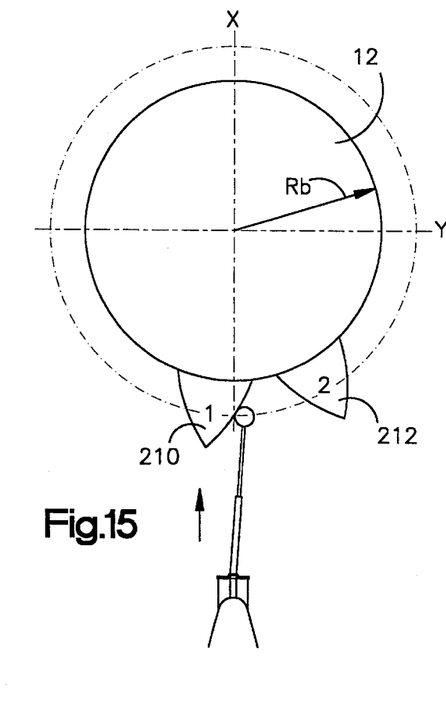
Figure 16:
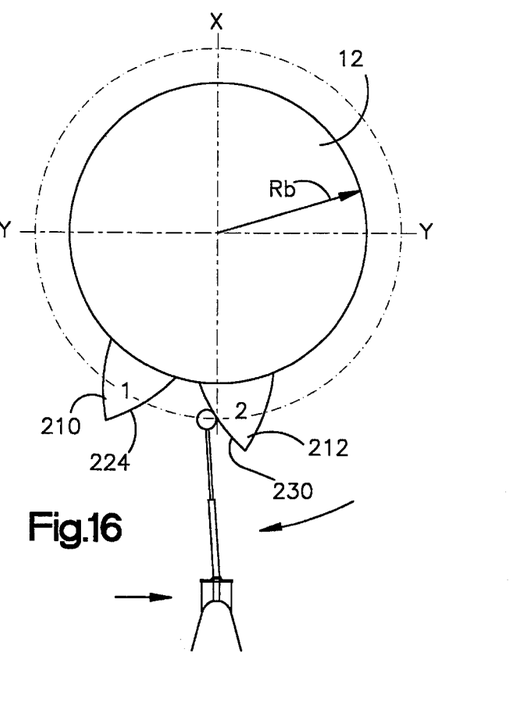

As seen in FIG. 8, the gear is then rotated so that a right flank 224 contact point of the gear tooth 210 approaches a point P where the tangent 222 of the base circle intersects the inspection radius. The stylus is simultaneously translated along the y axis. After the gear has completed its rotation, the stylus is moved inward along the x axis to place the x centerline of the spherical probe tip on the tangent line 222 and the contact point of the tip at the inspection radius. The gear is further rotated until the right flank deflects the probe tip and the gaging reads zero (FIG. 9). The rotary position of the right flank is recorded by the controller 62. As seen in FIG. 10 the probe stylus is then again retracted along the x direction.

The probe is now moved to the left so that the left flank contact point of the spherical probe tip would be on the y centerline of the gear if the probe is deflected to its 'zero' orientation. Note, when the probe contacts the left flank 220 (FIG. 12A), the probe will deflect so that the point P" is on this centerline. The gear is rotated until the left flank contact point at the inspection diameter is coincident with the gear's y axis centerline. Note, the rotation of the gear and the movement of the probe to this position can be simultaneous. The controller knows the contact point with precision due to the previously performed set-up steps on the first gear tooth 210.

The probe is next moved in along the x (FIG. 12) axis to place the contact point of the probe tip P" on the y centerline (x axis in FIG. 12) in contact with the left tooth flank of the tooth 210. A measurement is taken and presumably the gauging circuit 209 reads "zero." If the gauging circuit 209 does not read "zero", its reading is added or subtracted from every subsequent reading taken around the object circumference. The probe is retracted out of the way of the intertooth spacing.

The probe is next re-positioned along the Y-axis to place the contact point of the probe tip for the right flank 224 at the part y centerline when the stylus is deflected to "zero." Simultaneously, the part is rotated to place the point on the right flank that coincides with the inspection diameter at the y axis centerline. The probe is moved in along the x axis (FIG. 15) to position the contact point of the spherical probe tip at the inspection radius and y centerline of the gear tooth and in contact with the tooth flank. A probe measurement is taken and recorded.

The gear is again rotated (clockwise) to the theoretically correct point at which the probe contacts the left flank 230 of the second tooth 212 coincident with the inspection radius at the y axis centerline of the gear. Simultaneously, the probe is moved along the y axis to place the left flank contact point of the spherical probe tip at the "y" axis centerline. A measurement is taken and the measuring process continues. Note that to reach the point along the left flank 230 of the tooth 212 the probe was not withdrawn from the teeth spacing region but that when a right flank measurement is required the probe must be withdrawn before the gear can be rotated to the next inspection position.

Figure 17:
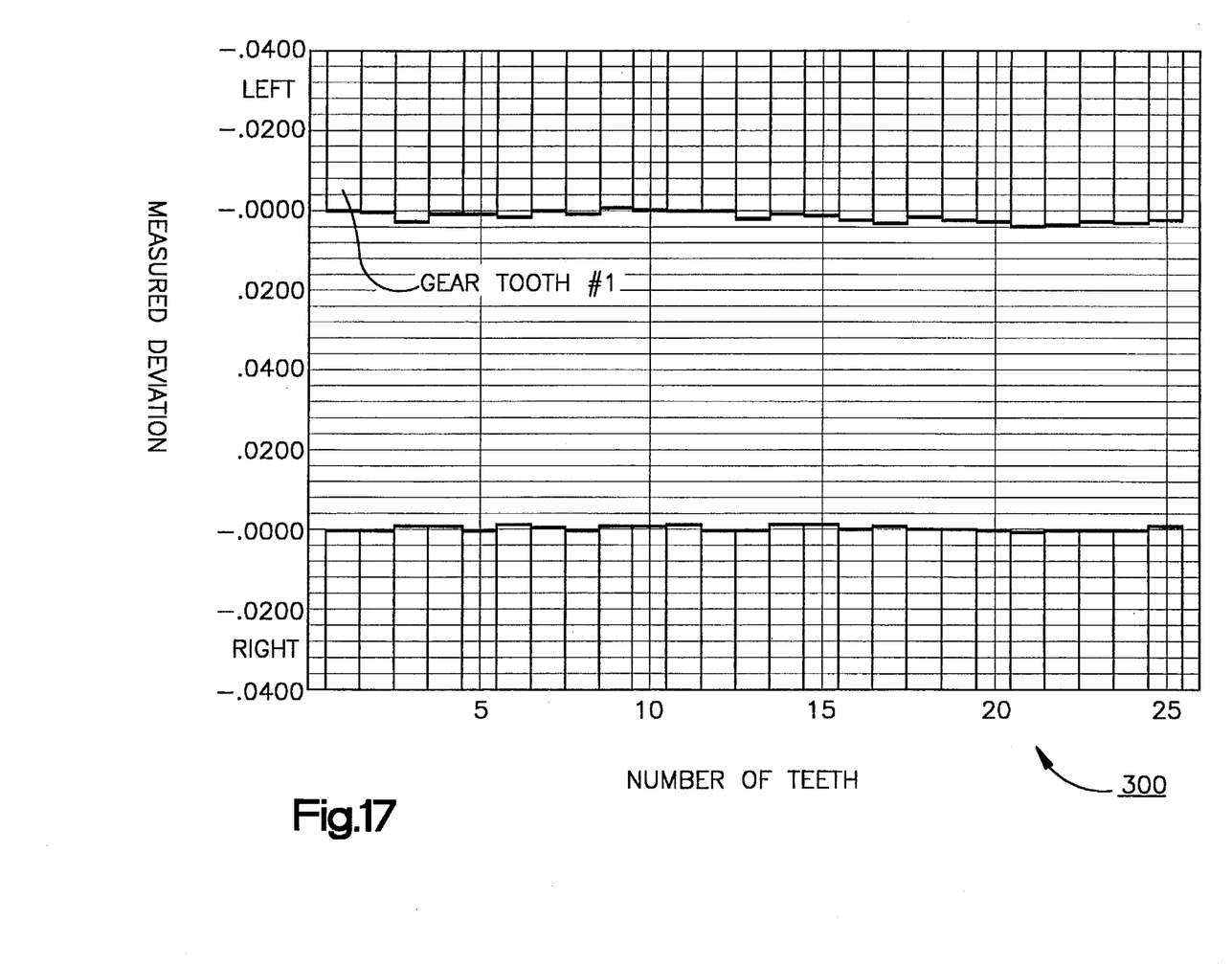
FIG. 17 is a hard copy output showing results of a one-revolution scan of an object.

Once one rotation of the gear with accompanying inspection has been completed, the controller 60 can compare sensed data with theoretically correct data and present the data on the display 52 or provide a hard-copy print-out 300 (FIG. 17) on an attached printer.

The present invention has been described with a degree of particularity. It is the intent that the invention include all modifications and alterations from the disclosed design falling within the spirit or scope of the appended claims.

We claim:

1. A monitoring system having a spherical stylus that can be moved along a controlled travel path to bring the stylus into contact with an object to determine a shape of the object comprising:

a) a base having a generally level support surface for mounting structure supporting a spherical stylus having a curved object contacting surface for movement along a travel path;

b) a moveable frame having an arm that extends away from said frame and supports the stylus to orient and position the stylus relative to the base;

c) track means supported by the base for defining a three-dimensional travel path for the frame and attached stylus;

d) a frame drive system for moving the frame and attached stylus on the track means;

e) an object drive motor and support coupled to the object drive motor for rotating the object about a rotation axis relative to the base; and f) a controller for activating the frame drive system and object drive motor to repeatedly bring the stylus into contact with both right and left surfaces of a number of repeating structures around a circumference of the object as the object drive motor circumferentially orients the object, said controller including a control program for first positioning a reference point of the spherical stylus and rotating one surface of a first repeating structure into contact with the object contact surface to calculate a series of reference positions of right and left surfaces of the repeating structures based on a desired object shape, and then alternately activating the frame drive system to shift the spherical stylus back and forth on opposite sides of a radial centerline passing through the rotation axis an amount based on the size of the spherical stylus and moving the spherical stylus into and out of gaps between the repeating structures to contact left and right surfaces as the controller intermittently rotates the object through one rotation to determine contact positions on left and right surfaces of said repeating structures.

2. The monitoring system of claim 1 wherein the track means comprises structure for moving the stylus along three mutually orthogonal directions and the shifting back and forth of the stylus on either side of the radial centerline is performed by the controller activating the frame drive system back and forth to move the stylus along one of the orthogonal directions.

3. Apparatus for checking a configuration of an object mounted for rotation about an axis which has a series of regularly occurring features along a surface of said object comprising:

a) a moveable probe including a spherical stylus having a curved outer surface for contacting the object;

b) a support for the probe and a drive system for moving the support along controlled orthogonal paths to bring the spherical stylus into contact with the object;

c) a motor and an object support coupled to the motor for rotating the object about a rotation axis; and d) a controller for activating the motor to rotate the object to a series of measurement orientations where right and left facing surfaces of the regularly occurring features are brought into contact with the, spherical stylus, activating the drive system to move the probe radially in and out along a direction parallel to a centerline passing through the rotation axis after shifting the spherical stylus to the side of the centerline a distance based on the diameter of the stylus to cause a controlled location on a curved outer surface of the stylus to contact the object, and a memory for storing locations at which the stylus contacts the object at each of the measurement orientations;

e) said controller including a program for comparing the sensed point of contact between the object and the stylus and computing deviations between the sensed point of contact and an object profile corresponding to an object shape.

4. A method for inspecting an object that has a series of regularly occurring structures about a surface of the object comprising the steps of:

a) mounting an object for rotation about a center of rotation;

b) supporting a probe having a spherical stylus for movement relative to the object along mutually orthogonal directions including a direction radial to the center of rotation to allow the stylus to be inserted into a gap between the regularly occurring structures to contact the object;

c) defining a first reference position of a first structure of said regularly occurring structures on the object by positioning the stylus at an inspection radius between two of said structures and rotating the first structure into contact with the stylus; and d) repeatedly contacting other surfaces with the stylus, in order around the circumference of the object and recording positions of contact between the stylus and the object by i) controlled side to side movements of the stylus about a centerline passing through an axis of rotation of the object based on the size of the spherical stylus that are coordinated with ii) rotation of the object and iii) in and out movement of the stylus from a space between surfaces after two successive surfaces are contacted to allow rotation of the object.

5. The method of claim 4 wherein the in and out movements of the stylus are orthogonal to the side to side shifting of the stylus.

\* \* \* \* \*